US010133523B2

(12) United States Patent
Miyazawa

(10) Patent No.: US 10,133,523 B2
(45) Date of Patent: Nov. 20, 2018

(54) CONTROL DEVICE THAT PREDICTS RESIDUAL QUANTITY OF PRINTING MATERIAL IN CARTRIDGE CURRENTLY MOUNTED IN PRINTER

(71) Applicant: BROTHER KOGYO KABUSHIKI KAISHA, Nagoya, Aichi (JP)

(72) Inventor: Masafumi Miyazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/655,012

(22) Filed: Jul. 20, 2017

(65) Prior Publication Data

US 2018/0024786 A1 Jan. 25, 2018

(30) Foreign Application Priority Data

Jul. 21, 2016 (JP) .................................. 2016-143271

(51) Int. Cl.
*G06F 3/12* (2006.01)
*H04N 1/00* (2006.01)
(Continued)

(52) U.S. Cl.
CPC ....... *G06F 3/1219* (2013.01); *G03G 15/5079* (2013.01); *G03G 15/556* (2013.01);
(Continued)

(58) Field of Classification Search
CPC ...... G06F 3/121; G06F 3/1204; G06F 3/1218; G06F 3/1219; G06F 3/1229; G06F 3/1231; G06F 3/1235; G06F 3/1285; G06F 3/1287; G06F 3/1296; H04N 1/00344; H04N 1/00954; H04N 1/00015; H04N 1/00034;
(Continued)

(56) References Cited

U.S. PATENT DOCUMENTS 5,797,061 A * 8/1998 Overall ................ B41J 2/17566
399/24
5,802,420 A * 9/1998 Garr ..................... B41J 2/17566
347/19
(Continued)

FOREIGN PATENT DOCUMENTS

JP 2003-015477 A 1/2003

*Primary Examiner* — Scott A Rogers
(74) *Attorney, Agent, or Firm* — Scully, Scott, Murphy & Presser, PC

(57) ABSTRACT

A controller in a control device is configured to perform: acquiring a first value from a printer, the first value being related to a residual quantity of printing material remaining in a first cartridge at a first calendar date; acquiring a second value from the printer, the second value being related to a residual quantity of printing material remaining in a second cartridge at a second calendar date, the second cartridge being attached to the printer later than detachment of the first cartridge; estimating a third calendar date using the first value, the second value, the first calendar date, and the second calendar date, the third calendar date being a calendar date when a third value related to the residual quantity of printing material remaining in the second cartridge is assumed to be smaller than a prescribed quantity; and executing an output process according to the third calendar date.

14 Claims, 10 Drawing Sheets

(51) Int. Cl.
*H04N 1/23* (2006.01)
*G06K 15/02* (2006.01)
*G03G 15/00* (2006.01)
*G06K 15/00* (2006.01)

(52) U.S. Cl.
CPC ............ *G06F 3/121* (2013.01); *G06F 3/1204* (2013.01); *G06F 3/1229* (2013.01); *G06F 3/1235* (2013.01); *G06F 3/1285* (2013.01); *G06K 15/4075* (2013.01); *H04N 1/00015* (2013.01); *H04N 1/00034* (2013.01); *H04N 1/00061* (2013.01); *H04N 1/00068* (2013.01); *H04N 1/00079* (2013.01); *H04N 1/00323* (2013.01); *H04N 1/00344* (2013.01); *H04N 1/00954* (2013.01); *H04N 1/2346* (2013.01); *G06F 3/1231* (2013.01); *G06F 3/1287* (2013.01); *H04N 1/00082* (2013.01)

(58) Field of Classification Search
CPC ........... H04N 1/00061; H04N 1/00068; H04N 1/00079; H04N 1/00082; H04N 1/2346; G06K 15/4075; G03G 15/553; G03G 15/556; G03G 15/5079
See application file for complete search history.

(56) References Cited

U.S. PATENT DOCUMENTS

| | | | | |
|---|---|---|---|---|
| 6,609,461 | B2* | 8/2003 | Horii | B41J 2/17566 |
| | | | | 101/484 |
| 8,050,576 | B2* | 11/2011 | Yasukawa | G03G 15/556 |
| | | | | 399/262 |
| 8,086,115 | B2* | 12/2011 | Yamasaki | G03G 15/5079 |
| | | | | 399/24 |
| 8,543,015 | B2* | 9/2013 | Tokuno | G03G 15/5079 |
| | | | | 399/12 |
| 9,635,198 | B2* | 4/2017 | Sugihara | H04N 1/00244 |
| 9,904,881 | B2* | 2/2018 | Miyazawa | G06K 15/4075 |
| 9,967,414 | B2* | 5/2018 | Kawakami | H04N 1/00344 |
| 10,001,722 | B2* | 6/2018 | Miyazawa | G03G 15/5079 |
| 2013/0028616 | A1* | 1/2013 | Kunihiro | G06F 3/1204 |
| | | | | 399/27 |
| 2016/0286059 | A1* | 9/2016 | Hitaka | H04N 1/00344 |
| 2017/0371271 | A1* | 12/2017 | Miyazawa | G03G 15/0831 |

* cited by examiner

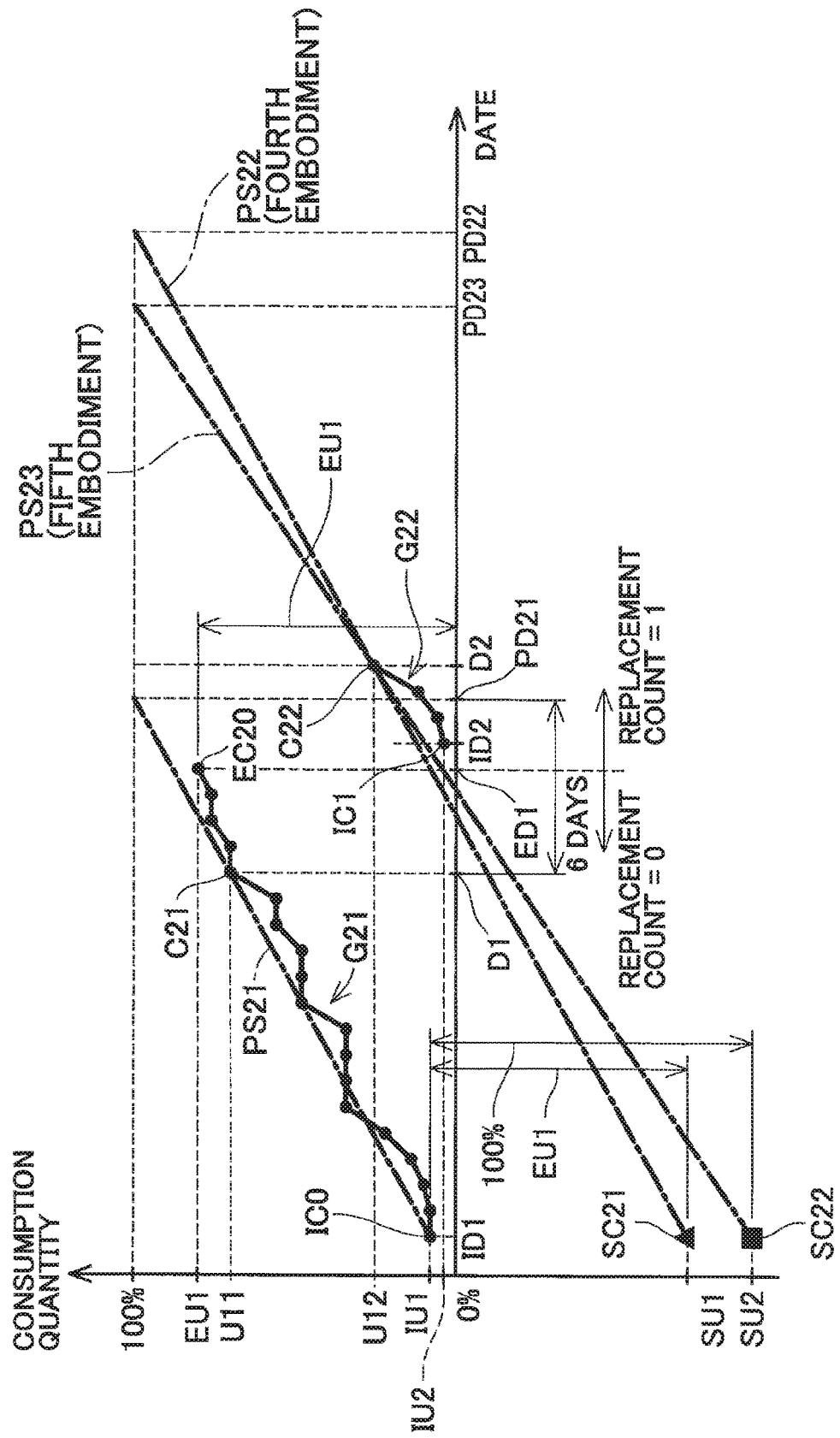

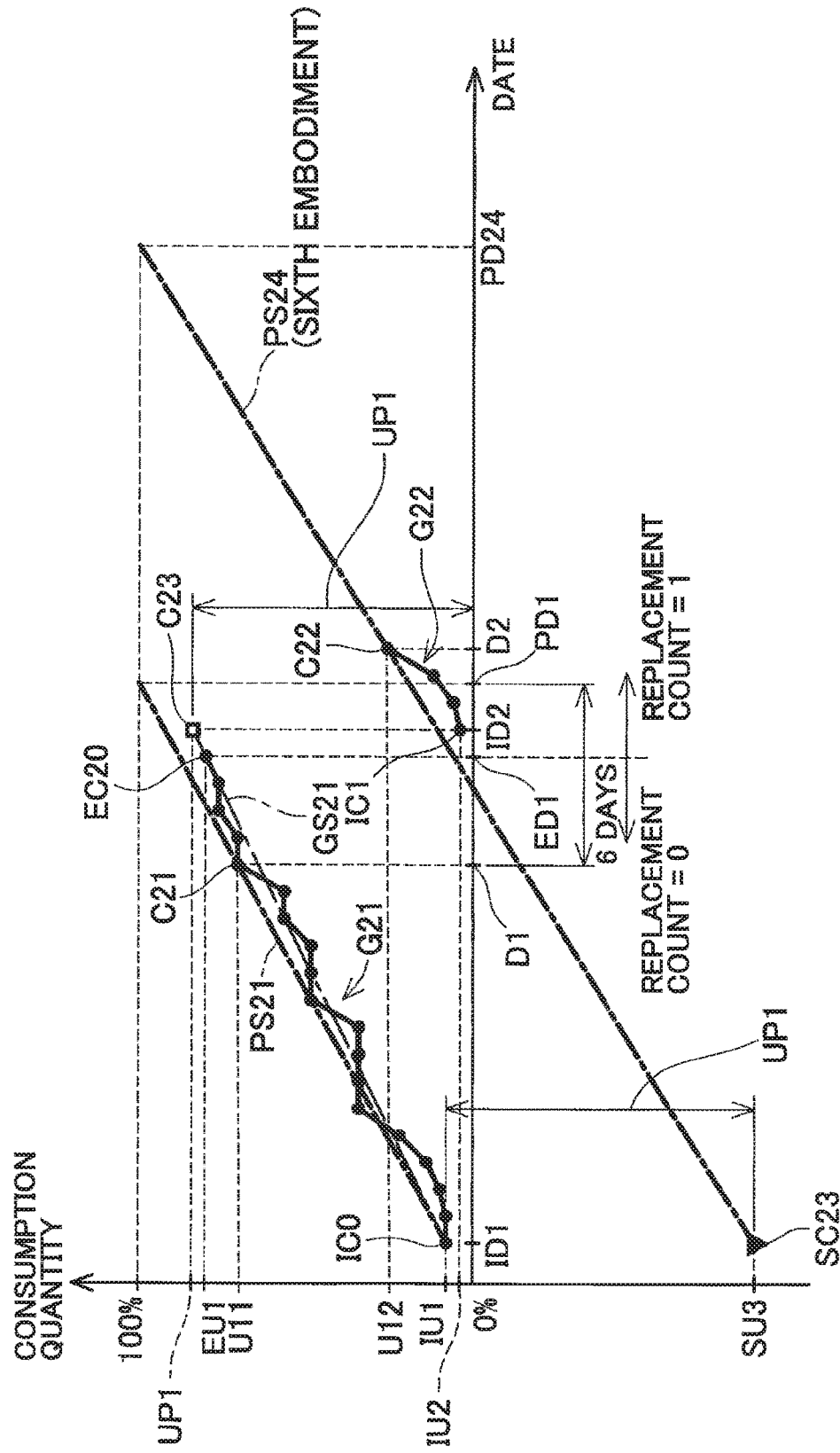

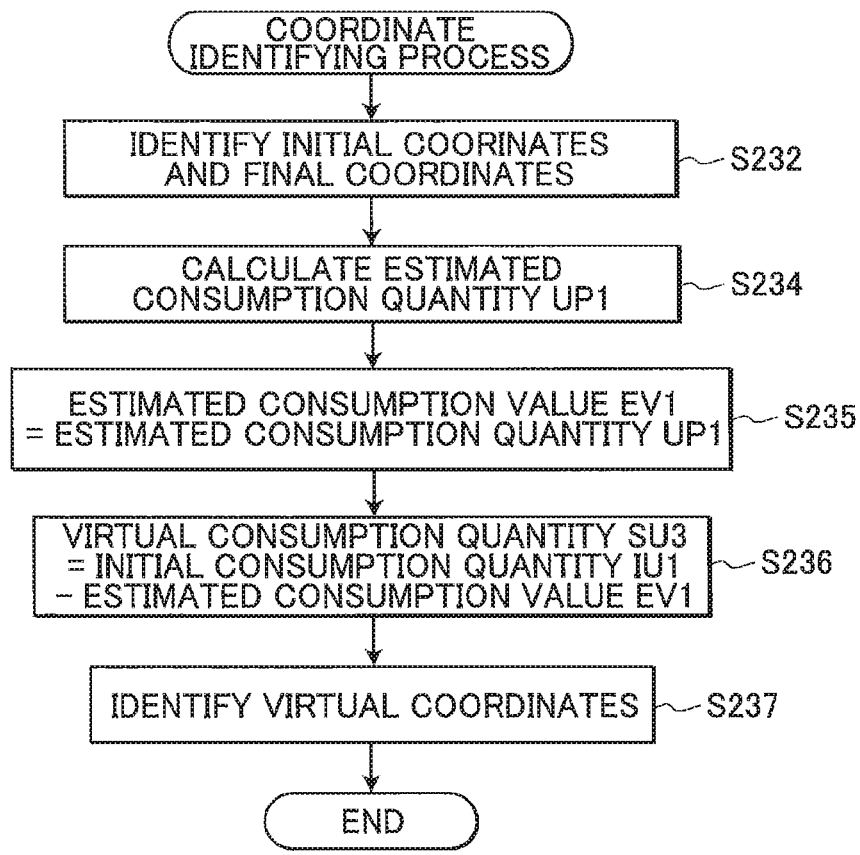

CONTROL DEVICE THAT PREDICTS RESIDUAL QUANTITY OF PRINTING MATERIAL IN CARTRIDGE CURRENTLY MOUNTED IN PRINTER

CROSS REFERENCE TO RELATED APPLICATION

This application claims priority from Japanese Patent Application No. 2016-143271 filed Jul. 21, 2016. The entire content of the priority application is incorporated herein by reference.

TECHNICAL FIELD

The present disclosure relates to a control device that executes processes related to a printer.

BACKGROUND

Japanese Patent Application Publication No. 2003-15477 describes a technique for estimating the number of days remaining until a printer can no longer print. Specifically, the printer measures the residual quantity of developer remaining in a cartridge every three days, and stores, in a memory, the residual quantity together with the number of days in which the cartridge accommodating the developer has been in use. Subsequently, the printer uses the plurality of residual quantities already stored in the memory to calculate a graph line for predicting future residual quantities of the developer. The printer then specifies a date corresponding to the residual quantity of the developer that is insufficient for printing on the graph line as an estimated date at which printing will no longer be possible. The graph line is a straight line that passes through the residual quantity on the date when the cartridge has begun to be used and a point specifying the most recent residual quantity.

SUMMARY

Thus, the slope of the straight line specifies the change in the residual quantity of the developer per unit time during a period from the date when the cartridge has begun to be used to the present. If this period is short, the printer must specify the estimated date by considering usage conditions of the developer only during this short period. Consequently, if a relatively large quantity of developer was used during this period, for example, the absolute value of the slope of the straight line becomes large and may lead the printer to specify an estimated date much earlier than the actual date on which printing will no longer be possible. Similarly, if a relatively small quantity of developer was used during this short period, the absolute value of the slope of the straight line becomes small and may lead the printer to specify an estimated date much later than the actual date on which printing will no longer be possible.

In view of the foregoing, it is an object of the present disclosure to provide a technique for accurately specifying future values related to future residual quantities of printing material.

In order to attain the above and other objects, the present disclosure provides a non-transitory computer readable storage medium storing a set of program instructions for a control device. The control device includes a controller. The set of program instructions, when executed by the controller, causes the control device to perform: acquiring a first value from a printer under a condition where a first cartridge is mounted in the printer, the first value being related to a residual quantity of printing material remaining in the first cartridge at a first calendar date; acquiring a second value from the printer under a condition where a second cartridge is mounted in the printer, the second cartridge being attached to the printer later than detachment of the first cartridge, the second value being related to a residual quantity of printing material remaining in the second cartridge at a second calendar date; estimating a third calendar date using the first value, the second value, and a time interval between the first calendar date and the second calendar date, the third calendar date being a calendar date when a third value related to the residual quantity of printing material remaining in the second cartridge is assumed to be smaller than a prescribed quantity; and executing an output process according to the third calendar date.

According to another aspect, the present disclosure provides a method for a control device. The control device includes a controller. The method includes: acquiring a first value from a printer under a condition where a first cartridge is mounted in the printer, the first value being related to a residual quantity of printing material remaining in the first cartridge at a first calendar date; acquiring a second value from the printer under a condition where a second cartridge is mounted in the printer, the second cartridge being attached to the printer later than detachment of the first cartridge, the second value being related to a residual quantity of printing material remaining in the second cartridge at a second calendar date; estimating a third calendar date using the first value, the second value, and a time interval between the first calendar date and the second calendar date, the third calendar date being a calendar date when a third value related to the residual quantity of printing material remaining in the second cartridge is assumed to be smaller than a prescribed quantity; and executing an output process according to the third calendar date.

According to still another aspect, the present disclosure provides a control device. The control device includes a controller. The controller is configured to perform: acquiring a first value from a printer under a condition where a first cartridge is mounted in the printer, the first value being related to a residual quantity of printing material remaining in the first cartridge at a first calendar date; acquiring a second value from the printer under a condition where a second cartridge is mounted in the printer, the second cartridge being attached to the printer later than detachment of the first cartridge, the second value being related to a residual quantity of printing material remaining in the second cartridge at a second calendar date; estimating a third calendar date using the first value, the second value, and a time interval between the first calendar date and the second calendar date, the third calendar date being a calendar date when a third value related to the residual quantity of printing material remaining in the second cartridge is assumed to be smaller than a prescribed quantity; and executing an output process according to the third calendar date.

BRIEF DESCRIPTION OF THE DRAWINGS

The particular features and advantages of the disclosure as well as other objects will become apparent from the following description taken in connection with the accompanying drawings, in which:

FIG. 5A is a graph showing changes in consumption quantities of printing material in specific cases for fourth and fifth embodiments;

FIG. 6A is a graph showing changes in consumption quantities of printing material in a specific case for a sixth embodiment; and FIG. 6B is a flowchart illustrating steps in the coordinate identifying process in the sixth embodiment.

DETAILED DESCRIPTION

First Embodiment (Structure of a Communication System 2)

Figure 1:
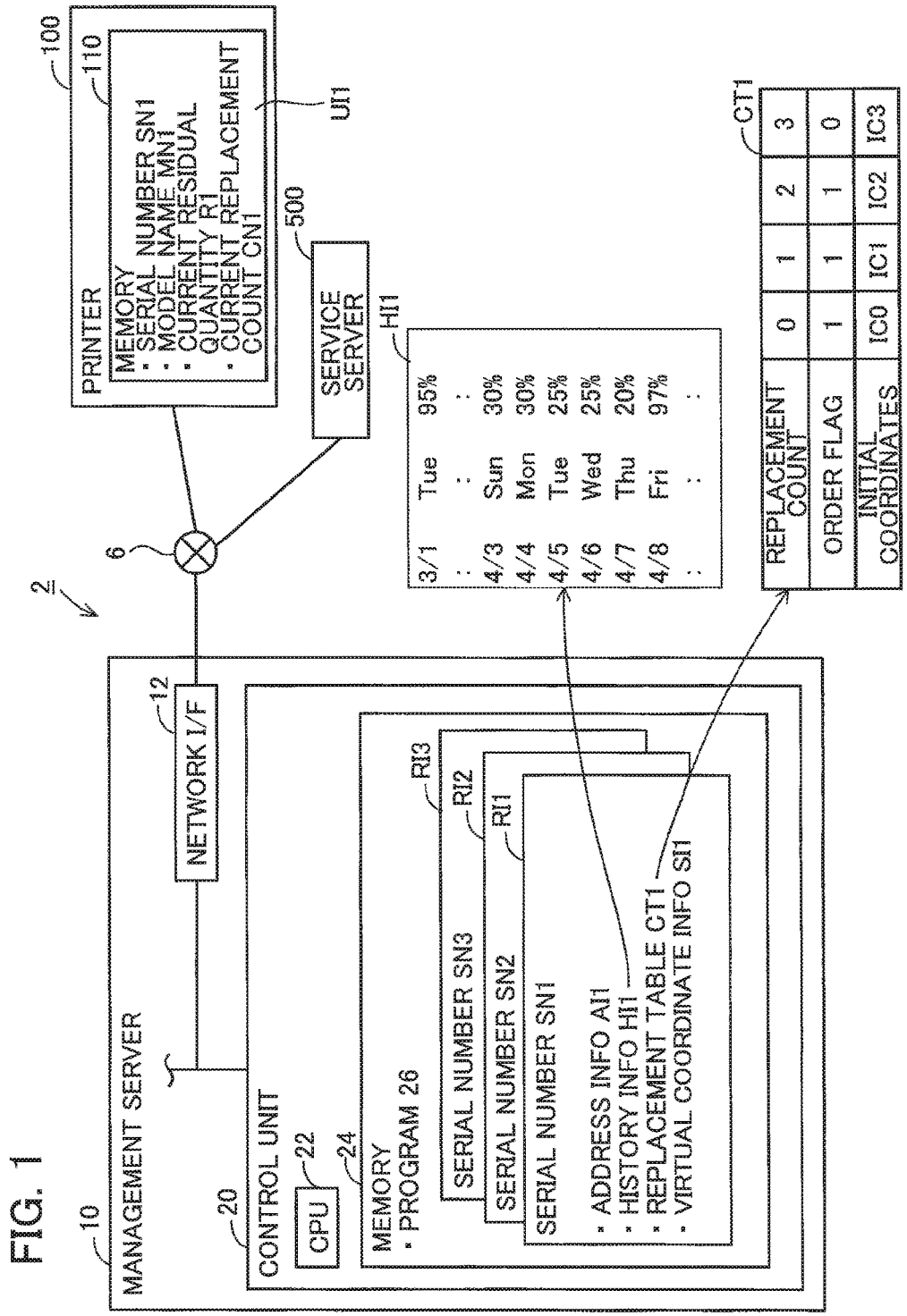
FIG. 1 is a block diagram showing a communication system according to first through third embodiments of the present disclosure.

FIG. 1 is a block diagram showing a communication system 2 according to a first embodiment. As illustrated in FIG. 1, the communication system 2 includes a management server 10, a printer 100, and a service server 500. The management server 10, the printer 100, and the service server 500 can communicate with one another over an Internet 6.

(Structure of the Printer 100)

The printer 100 can implement at least a printing function. The printer 100 executes printing using printing material (toner or ink, for example) accommodated in a cartridge (not shown) that is detachably mountable in the device body of the printer 100. The printer 100 includes a memory 110. The memory 110 is configured of a volatile memory, a nonvolatile memory, and the like.

The printer 100 stores a serial number SN1 in the memory 110. The serial number SN1 is assigned to the printer 100. The serial number SN1 is a unique character string assigned by the vendor of the printer 100 when the vendor manufactures a plurality of printers having the same model name as the model name of the printer 100 (model name MN1 in the present embodiment).

The printer 100 also stores a current residual quantity R1 and a current cartridge replacement count CN1 in the memory 110. The current residual quantity R1 indicates the residual quantity of printing material accommodated in the cartridge that is currently mounted in the printer 100. In the present embodiment, the current residual quantity R1 is represented by a ratio of the residual quantity of printing material to the maximum quantity of printing material that the cartridge can accommodate (units: %). The current cartridge replacement count CN1 specifies the number of replacement times of a cartridge in the printer 100.

Each time a new cartridge is mounted in the printer 100, the printer 100 updates the current residual quantity R1 to 100% in the memory 110. The value "100%" indicates the maximum quantity of printing material that the cartridge can accommodate. Thereafter, the printer 100 updates the current residual quantity R1 each time a printing operation is executed. More specifically, when the printer 100 acquires image data representing an image to be printed, the printer 100 uses this image data to estimate the consumption quantity of printing material required to print the image. After printing the image, the printer 100 subtracts the estimated consumption quantity (more specifically, a ratio of the consumption quantity to the full capacity of the cartridge) from the current residual quantity R1 to update the current residual quantity R1 in the memory 110. As a variation, the printer 100 may be provided with a sensor that measures the residual quantity of printing material in the cartridge, and the printer 100 may update the current residual quantity R1 each time the sensor measures the residual quantity of printing material.

The printer 100 also updates the current cartridge replacement count CN1 in the memory 110 each time the cartridge is replaced. More specifically, when a cartridge is first mounted in the printer 100 after the printer 100 has been shipped, the printer 100 stores a current cartridge replacement count CN1 specifying the value "0" (zero times) in the memory 110. Thereafter, the printer 100 increments the current cartridge replacement count CN1 by one each time the cartridge is replaced.

In the following description, the cartridge currently mounted in the printer 100 will be called the "current cartridge." The cartridge that was mounted in the printer 100 just prior to the current cartridge, i.e., the last cartridge mounted in the printer 100 before the current cartridge will be called the "preceding cartridge." In other words, the current cartridge is the next cartridge mounted in the printer 100 after the preceding cartridge.

Further, in the following description, information including the current residual quantity R1 stored in the memory 110 of the printer 100 will be called the "usage information UI1." In the present embodiment, the usage information UI1 includes the serial number SN1, the model name MN1, the current residual quantity R1 of printing material, and the current cartridge replacement count CN1, as illustrated in FIG. 1.

(Structure of the Management Server 10)

The management server 10 serves to manage a plurality of printers including the printer 100. The management server 10 is provided on the Internet 6 by the vendor of the printer 100.

The management server 10 includes a network interface (network I/F) 12, and a control unit 20. Each of the network I/F 12 and the control unit 20 is connected to a bus (not assigned a reference numeral in FIG. 1). The control unit 20 also includes a central processing unit (CPU) 22, and a memory 24. The memory 24 is configured of a volatile memory, a nonvolatile memory, and the like. The memory 24 stores a program 26 therein. The CPU 22 executes various processes according to the program 26 stored in the memory 24.

In addition to the aforementioned program 26, the memory 24 stores a plurality of sets of registration information RI. In the management server 10 of the present embodiment illustrated in FIG. 1, three sets of registration information RI1 through RI3 are stored in the memory 24. When the management server 100 acquires, from the printer 100, a registration command that includes the serial number SN1 of the printer 100, the CPU 22 registers the serial number SN1 in the memory 24. Next, the CPU 22 stores the registration information RI1 in the memory 24 in association with the serial number SN1.

The registration information RI1 includes address information AI1, history information HI1, a replacement table CT1, and virtual coordinate information SI1. The address information AI1 indicates the address for the user of the printer 100. The history information HI1 indicates the history of residual quantities of printing material.

Note that the CPU 22 similarly stores registration information RI2, RI3, and the like in the memory 24 as in the case of the printer 100 when acquiring registration commands from other printers. Specifically, when the management server 10 acquires a registration command including a serial number SN2 from a printer, the CPU 22 registers the serial number SN2 in the memory 24, and stores the registration information RI2 acquired from the printer in the memory 24 in association with the serial number SN2. When the management server 10 acquires a registration command including a serial number SN3 from another printer, the CPU 22 registers the serial number SN3 in the memory 24, and stores the registration information RI3 acquired from the printer in the memory 24 in association with the serial number SN3.

More specifically, after the serial number SN1 has been registered in the memory 24, the user of the printer 100 performs input operations on the printer 100 to input the address information AI1. The CPU 22 of the management server 10 then acquires the address information AI1 from the printer 100 and registers the address information AI1 in the memory 24 in association with the serial number SN1 of the printer 100.

The CPU 22 acquires usage information UI1 from the printer 100 at prescribed intervals (once a day, for example). The usage information UI1 includes the serial number SN1, the model name MN1, the current residual quantity R1 of printing material, and the current cartridge replacement count CN1, as described above. The usage information UI1 also includes a prescribed notification when the residual quantity of printing material in the current cartridge has fallen to a threshold value for the residual quantity (20%, for example) or less and does not include the prescribed notification when the residual quantity is greater than the threshold value for the residual quantity.

Each time the CPU 22 acquires usage information UI1 from the printer 100, the CPU 22 adds the date on which the usage information UI1 was acquired and the current residual quantity R1 included in the usage information UI1 to the history information HI1 in association with each other. As a result, the history information HI1 stored in the memory 24 includes a plurality of residual quantities for a plurality of dates. The history information HI1 includes information indicating residual quantities of printing material for both the preceding cartridge and the current cartridge, but does not include information indicating residual quantities of printing material for cartridges that were mounted in the printer 100 prior to the preceding cartridge. That is, the CPU 22 deletes information related to cartridges that were mounted in the printer 100 prior to the preceding cartridge from the history information HI1 when determining according to the current cartridge replacement count CN1 included in the acquired usage information UI1 that the cartridge in the printer 100 was replaced. As a variation, the CPU 22 may preserve all history information even when the cartridge in the printer 100 is replaced. In other words, the history information HI1 may include information for all cartridges that were previously mounted in the printer 100.

The replacement table CT1 associates each replacement count with an order flag and initial coordinates.

The order flag indicates whether order information for ordering a new cartridge to be shipped to the user of the printer 100 has been supplied to the server 500. An order flag of "0" indicates that the order information has not been supplied to the service server 500 while the cartridge corresponding to the replacement count associated with this order flag has been mounted in the printer 100. An order flag of "1" indicates that the order information has been supplied to the service server 500. The order information includes the address information AI1 of the user of the printer 100 and cartridge information. The cartridge information indicates the type of cartridge that is compatible with the model of the printer 100. The model of the printer 100 is indicated by the model name MN1 provided in the usage information UI1. As a variation, the order information may include the model name MN1 in place of the cartridge information. In this case, the type of cartridge to be shipped is specified on the basis of the model name MN1. Further, the order information may include color information specifying color of printing material as the cartridge information.

Initial coordinates (IC0, for example) specify the current residual quantity R1 included in the usage information UI1 and the date on which this usage information UI1 was acquired. Here, the usage information UI1 was acquired after the cartridge corresponding to the replacement count associated with the initial coordinates in the replacement table CT1 was mounted in the printer 100. In the following description, the current residual quantity R1 specified by the initial coordinates will be called the initial residual quantity IR1. In other words, the initial coordinates specifies the initial residual quantity IR1 of the cartridge and the date on which the initial residual quantity IR1 is acquired as the current residual quantity R1.

In the first through third embodiments, the coordinate system whose horizontal axis represents the date and whose vertical axis represents the residual quantity of printing material is used. That is, each set of coordinates specifies a date and a residual quantity of printing material on the date.

The virtual coordinate information SI1 in the registration information RI1 indicates virtual coordinates identified in a coordinate identifying process described later (see S24 of FIG. 2). The virtual coordinates specify a virtual residual quantity SR1 estimated in the coordinate identifying process and the date specified by the initial coordinates. The virtual coordinate information SI1 will be described later in detail.

(Structure of the Service Server 500)

The service server 500 serves to provide a delivery service for cartridges. The service server 500 may be provided on the Internet 6 by the vendor of the management server 10 or may be provided by a company separate from the vendor. When the service server 500 acquires order information supplied from the management server 10, the service server 500 coordinates the shipping of a cartridge to the address indicated by the address information AI1 included in the order information.

(Ordering Process)

Next, steps in an ordering process will be described with reference to FIG. 2. The CPU 22 of the management server 10 executes the ordering process according to the program 26. The ordering process is triggered when the power for the management server 10 is turned on.

Figure 2:
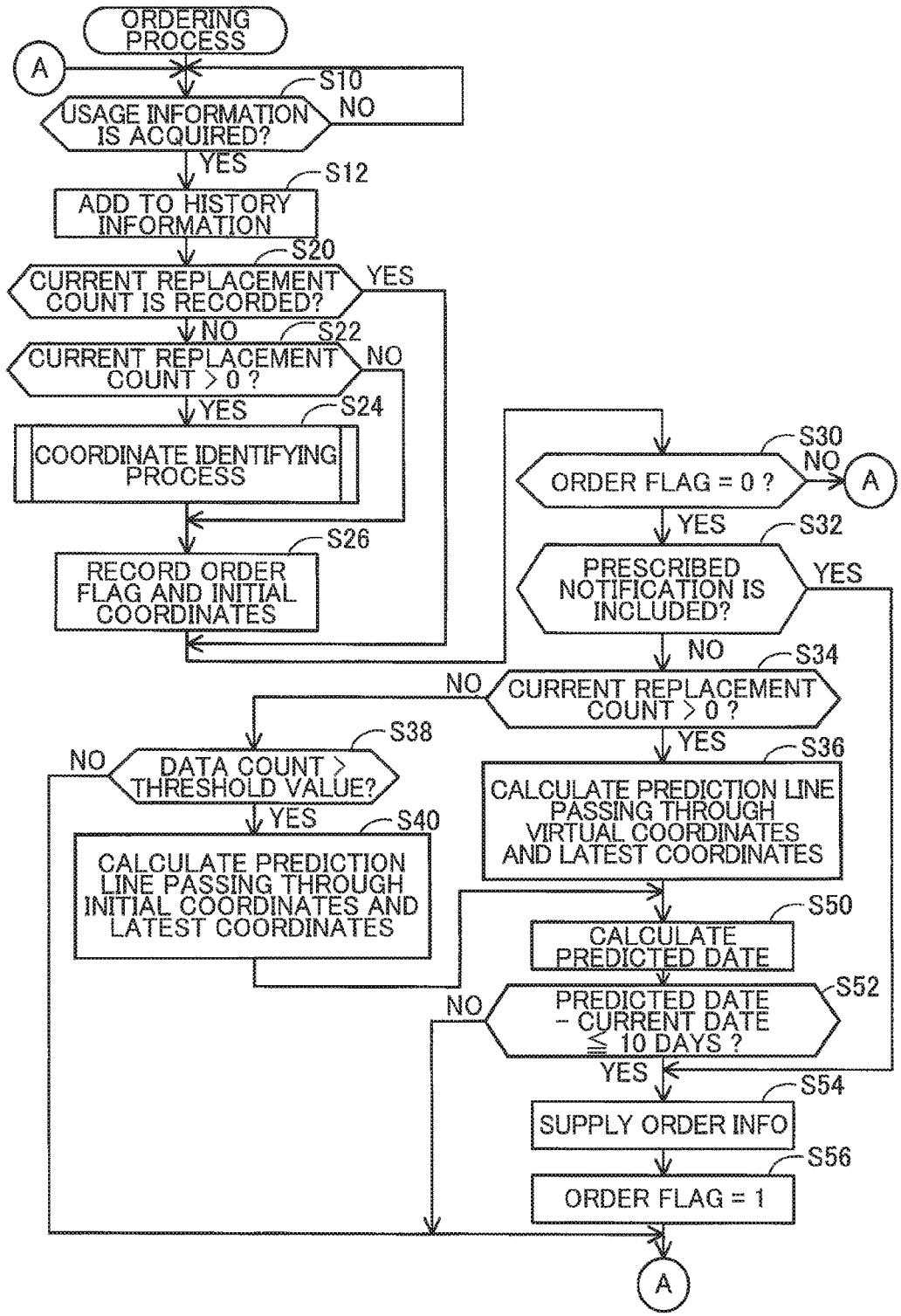
FIG. 2 is a flowchart illustrating steps in an ordering process executed by a CPU of a management server.

In S10 of FIG. 2, the CPU 22 monitors the network I/F 12 for the usage information (UI1, for example) acquired from a printer (the printer 100, for example). In the present embodiment, usage information is acquired from a printer once a day. As a variation, usage information may be acquired from a printer at prescribed time intervals (every twelve hours, for example). When usage information is acquired (S10: YES), the CPU 22 identifies the registration information (RI1, for example) associated, in the memory 24, with the serial number (SN1, for example) included in the usage information and advances to S12. The following example will assume that the CPU 22 identifies the registration information RI1 corresponding to the printer 100.

Note that if the CPU 22 has been unable to acquire usage information from the printer once a day for a prescribed period prior to the current day (the past two days, for example) for any reason (the network I/F 12 being disconnected from the Internet 6, for example), the CPU 22 will also acquire the past usage information that was inaccessible in the prescribed period in addition to usage information to be acquired for the current date. The past usage information may be stored in a memory on the printer in association with the dates on which the past usage information was to be acquired, for example.

In S12 the CPU 22 associates the current residual quantity R1 included in the usage information UI1 acquired in S10 with the current date, and adds this information to the history information HI1 included in the registration information RI1 associated with the serial number SN1 in the memory 24. When past usage information UI1 was acquired in S10, the CPU 22 also associates the current residual quantities R1 included in this past usage information UI1 with the past dates, and adds this information to the history information HI1 in the registration information RI1.

In S20 the CPU 22 determines whether the current replacement count CN1 included in the usage information UI1 acquired in S10 is recorded in the replacement table CT1. If the current replacement count CN1 is not recorded in the replacement table CT1 (S20: NO), the CPU 22 determines that the cartridge in the printer 100 has been replaced during a period from the previous acquisition of the usage information UI1 to the current acquisition of the usage information UI1, and advances to S22. On the other hand, if the current replacement count CN1 is recorded in the replacement table CT1 (S20: YES), the CPU 22 determines that the cartridge in the printer 200 has not been replaced during the period from the previous acquisition of the usage information UI1 to the current acquisition of the usage information UI1, and skips S22 through S26 to advances to S30.

In S22 the CPU 22 determines whether the current replacement count CN1 is greater than zero. If the current replacement count CN1 is greater than zero (S22: YES), in S24 the CPU 22 executes a coordinate identifying process, and in S26 records the current replacement count CN1 in the replacement table CT1 in association with an order flag specifying "0" and the initial coordinates. In this case, the initial coordinates are coordinates specifying a current date and the current residual quantity R1 included in the usage information UI1 acquired in S10. That is, the current residual quantity R1 acquired on the current day is recorded as the initial residual quantity IR1 for the current cartridge in the replacement table CT1 along with the current date.

Note that if the CPU 22 acquires one or more sets of past usage information UI1 in S10 that include current replacement counts CN1 not yet recorded in the replacement table CT1, then in S26 the CPU 22 records, in the replacement table CT1, initial coordinates that specify the earliest date among the one or more past dates in the one or more sets of past usage information UI1 including an unrecorded current replacement count CN1 and the current residual quantity R1 included in the past usage information UI1 on this earliest date. That is, the current residual quantity R1 on this earliest date is recorded as the initial residual quantity IR1 for the current cartridge in the replacement table CT1 along with the earliest date.

On the other hand, if the CPU 22 determines in S22 that the current replacement count CN1 is zero (S22: NO), the CPU 22 skips S24 and in S26 records the current replacement count CN1 (i.e., "0"), an order flag specifying "0", and the initial coordinates IC0 in the replacement table CT1 in association with each other. After completing the process in S26, the CPU 22 advances to S30.

Next, steps in the coordinate identifying process of S24 will be described with reference to FIG. 3B. In S112 the CPU 22 identifies the initial coordinates for the preceding cartridge in the replacement table CT1. The CPU 22 specifies the initial coordinates associated, in the replacement table CT1, with the replacement count obtained by subtracting one from the current replacement count CN1. The CPU 22 identifies the date for the previous day and the residual quantity on the previous day from the history information HI1, and sets the coordinates specifying this information as the final coordinates. That is, the final coordinates specify the date on which the usage information UI1 was acquired last time under a condition where the preceding cartridge was mounted in the printer 100 and the current residual quantity R1 included in the acquired usage information UI1. In the following description, the residual quantity specified by the final coordinates will be called the "final residual quantity ER1."

Note that when the CPU 22 acquires one or more sets of past usage information UI1 in S10 that include a current replacement count CN1 not yet recorded in the replacement table CT1, the CPU 22 identifies the current residual quantity R1 on the date just prior to the earliest date among the one or more past dates in the one or more sets of past usage information UI1 as the final residual quantity ER1, and identifies coordinates specifying the date just prior to the earliest date among the one or more past dates and the final residual quantity ER1 as the final coordinates.

In S115 the CPU 22 specifies an estimated consumption value EV1. More specifically, the CPU 22 specifies the estimated consumption value EV1 by subtracting the final residual quantity ER1 specified by the final coordinates identified in S112 from a value "100%" representing the maximum quantity of printing material that the cartridge can accommodate. The estimated consumption value EV1 is estimated to be the quantity of printing material consumed in the preceding cartridge during the period from when the preceding cartridge was attached to the printer 100 until the preceding cartridge was detached from the printer 100 (herein after also called the "preceding consumption quantity"). In the present embodiment, the estimated consumption value EV1 is specified under the assumption that the preceding cartridge was replaced with the current cartridge while the preceding cartridge still accommodate printing material of the quantity specified by the final residual quantity ER1.

In S116 the CPU 22 estimates the virtual residual quantity SR1. The CPU 22 calculates the virtual residual quantity SR1 by adding the estimated consumption value EV1 to the initial residual quantity IR1 specified by the identified initial coordinates.

Subsequently, in S117 the CPU 22 identifies virtual coordinates that specify the date indicated by the initial coordinates and the virtual residual quantity SR1 calculated in S116, and stores virtual coordinate information SI1 (see FIG. 1) representing the virtual coordinates in the memory 24. The virtual coordinates specify a virtual residual quantity of the current cartridge on the date specified by the initial coordinates when assuming that the current cartridge is a virtual cartridge capable of accommodating more printing material than the maximum quantity (i.e., 100%). Note that the old virtual coordinate information SI1 in the memory 24 is updated to new virtual coordinate information SI1 each time the CPU 22 executes the coordinate identifying process of S24 in FIG. 2.

In S30 the CPU 22 identifies the order flag associated with the current replacement count CN1 from the replacement table CT1 included in the registration information RI1 and determines whether the order flag is set to "0". When the order flag is "0" (S30: YES), that is, when order information has not yet been supplied to the service server 500 after the current cartridge was attached to the printer 100, the CPU 22 advances to S32. When the order flag specifies "1" (S30: NO), that is, when order information has been supplied to the service server 500, the CPU 22 skips the remaining process from S32 and returns to S10.

In S32 the CPU 22 determines whether the usage information UI1 acquired in S10 includes a prescribed notification. When the usage information UI1 includes the prescribed notification (S32: YES), the CPU 22 skips the process from S34 to S52 and advances to S54. In S54 the CPU 22 supplies order information to the service server 500. In this way, the CPU 22 can reliably provide the order information to the service server 500 when the current residual quantity R1 of printing material in the current cartridge is less than the threshold value for the residual quantity and is approaching 0%. However, if the usage information UI1 does not include the prescribed notification (S32: NO), the CPU 22 advances to S34.

S34 is identical to S22 described above. That is, in S34 the CPU 22 determines whether the current replacement count CN1 is greater than zero. When the CPU 22 reaches an affirmative determination in S34, the CPU 22 advances to S36. In S36 the CPU 22 calculates a prediction line to be a straight line passing through the virtual coordinates specified by the virtual coordinate information SI1 and the latest coordinates. The latest coordinates specify the latest date included in the history information HI1 (i.e., current date) and the residual quantity on the latest date. After completing S36, the CPU 22 advances to S50.

If the CPU 22 reaches a negative determination in S34, the CPU 22 advances to S38. In S38 the CPU 22 determines whether the data count included in the history information HI1 (i.e., the number of residual quantities) is greater than a threshold value for the data count (ten, for example). The CPU 22 advances to S40 when determining that the data count is greater than the threshold value for the data count (S38: YES), whereas the CPU 22 returns to S10 when determining that the data count is less than or equal to the threshold value for the data count (S38: NO).

In S40 the CPU 22 identifies initial coordinates IC0 associated with the replacement count "0" from the replacement table CT1 and calculates a prediction line to be the straight line passing through the initial coordinates IC0 and the latest coordinates. After completing the process in S40, the CPU 22 advances to S50.

In S50 the CPU 22 finds the date specified by a point corresponding to a residual quantity of 0% on the prediction line calculated in S36 or S40, and sets this date as a predicted date. That is, the predicted date is the date on which it is predicted that the residual quantity of printing material in the current cartridge will become 0%. In other words, the predicted date is the date on which it is predicted that the printer 100 will become unable to print using printing material in the current cartridge.

In S52 the CPU 22 determines whether the period from the current date to the predicted date is no greater than ten days. A different interval from ten days may be used in a variation. When the period from the current date to the predicted date falls within ten days (S52: YES), the CPU 22 advances to S56. When the period from the current date to the predicted date is greater than ten days (S52: NO), the CPU 22 skips the remaining process in FIG. 2 to return to S10.

In S54 the CPU 22 supplies order information to the service server 500. The order information includes the address information AI1 in the registration information RI1, and the cartridge information, as described above. Upon receipt of this order information, the service server 500 ships a cartridge conforming to the cartridge information to the address of the user specified by the address information AI1.

In S56 the CPU 22 modifies the order flag identified in S30, which is recorded in the replacement table CT for the current cartridge, from "0" to "1", and subsequently returns to S10.

Figure 3A:
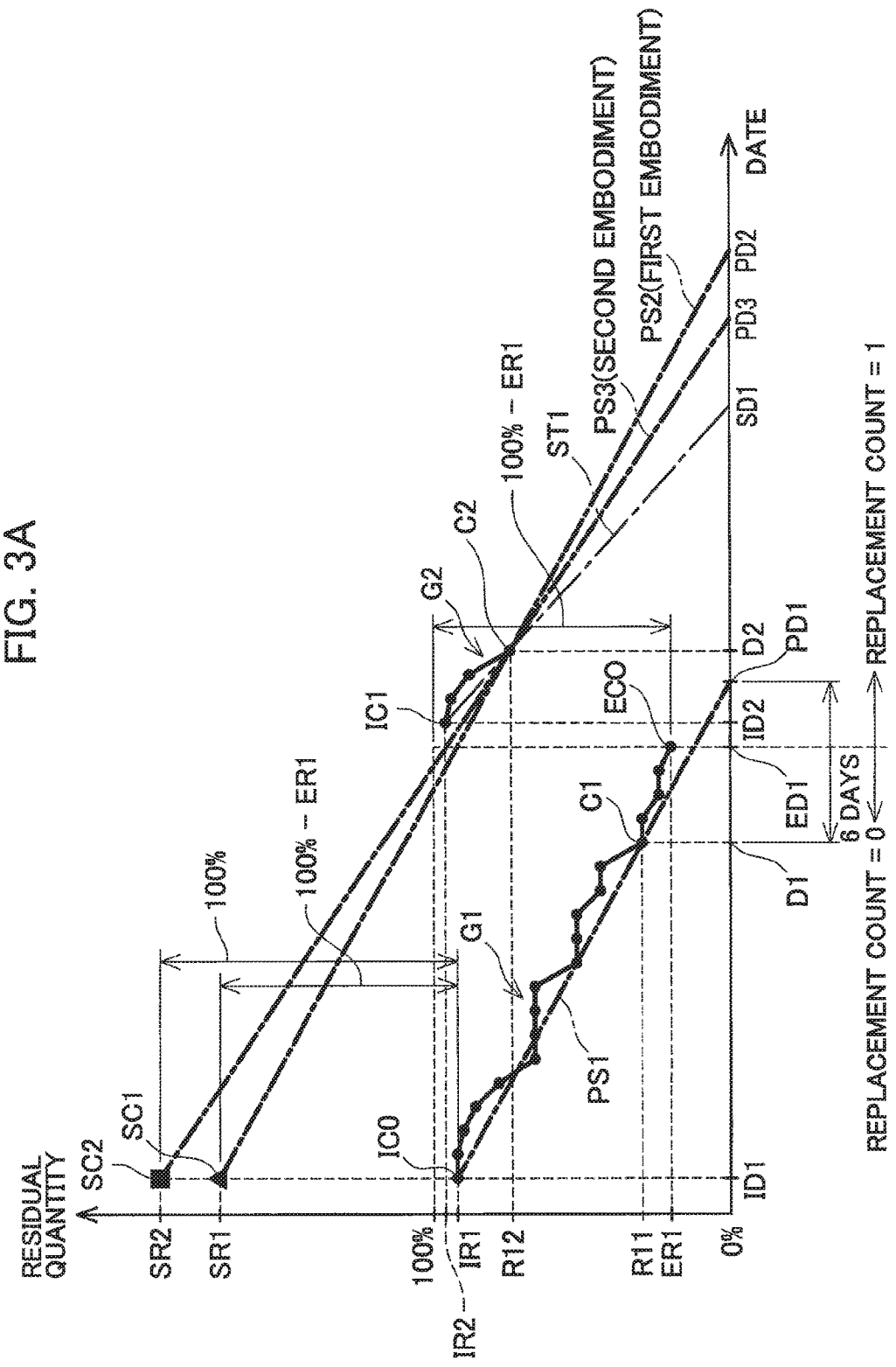
FIG. 3A is a graph showing changes in residual quantities of printing material in specific cases for the first and second embodiments.

(A Specific Case for the First Embodiment; FIG. 3A)

FIG. 3A illustrates a graph whose horizontal axis represents the date and whose vertical axis represents the residual quantity of printing material. In the present embodiment, the timing at which the CPU 22 acquires usage information UI1 from the printer 100 may be the same or different every day. However, by assuming the timing is the same every day, each date in the graph corresponds to a date and time.

Each dot plotted on the graph indicates a residual quantity at a date included in the history information HI1. A graph line G1 on the graph shows the history of residual quantities of printing material in the first cartridge that was mounted in the printer 100 for the first time after the printer 100 was shipped. A graph line G2 shows the history of residual quantities of printing material in the second cartridge with which the first cartridge was replaced. In this case, the first cartridge and the second cartridge correspond to the preceding cartridge and the current cartridge, respectively. The same will apply to the graph in FIG. 4A described later.

When the CPU 22 acquires the usage information UI1 including a current replacement count CN1 specifying "0" on a date ID1 for the first time, the CPU 22 records the initial coordinates IC0 specifying an initial residual quantity IR1 on the date ID1 in the replacement table CT1 in association with the replacement count of "0" (S22: NO and S26). Since the data count in the history information HI1 is not greater than the threshold value for the data count in this case (S38: NO), the CPU 22 does not calculate a prediction line.

When the CPU 22 subsequently acquires usage information UI1 including a current replacement count CN1 specifying "0" on a date D1, the CPU 22 calculates a prediction line PS1 that passes through the initial coordinates IC0 and the latest coordinates C1 specifying the residual quantity R11 on the date D1 (S40). The CPU 22 calculates a predicted date PD1 to be the date specified by a point corresponding to a residual quantity of 0% on the prediction line PS1 (S50). Since the interval from the date D1 to the predicted date PD1 is six days in the case illustrated in FIG. 3A (S52: YES), the CPU 22 supplies order information to the service server 500 (S54). Subsequently, the CPU 22 acquires usage information UI1 including a current replacement count CN1 specifying "0" every day until a date ED1, and adds the dates and residual quantities to the history information HI1 (S12).

On a date ID2 the CPU 22 acquires usage information UI1 that includes a current replacement count CN1 specifying "1" for the first time. Since a replacement count of "1" is not recorded in the replacement table CT1 (S20: NO and S22: YES), the CPU 22 executes the coordinate identifying process (S24 and FIG. 3B). The CPU 22 calculates the estimated consumption value EV1 by subtracting the final residual quantity ER1 on the date ED1 specified by the final coordinates EC0 from the maximum quantity of 100% (S115 of FIG. 3B), and calculates the virtual residual quantity SR1 by adding this estimated consumption value EV1 to the initial residual quantity IR1 on the date ID1 specified by the initial coordinates IC0 (S116). Next, the CPU 22 identifies the virtual coordinates SC1 that specify the virtual residual quantity SR1 on the date ID1, and stores virtual coordinate information SI1 representing the virtual coordinates SC1 in the memory 24 (S117). The CPU 22 also records initial coordinates IC1 specifying the initial residual quantity IR2 on the date ID2 in the replacement table CT1 in association with a replacement count specifying "1" (S26 of FIG. 2).

When the CPU 22 subsequently acquires usage information UI1 including a current replacement count CN1 specifying "1" on a date D2, the CPU 22 calculates a prediction line PS2 that passes through the virtual coordinates SC1 and the latest coordinates C2 specifying the residual quantity R12 on the date D2 (S36). Next, the CPU 22 calculates a predicted date PD2 to be the date specified by a point corresponding to a residual quantity of 0% on the prediction line PS2 (S50).

As a comparative example, it is possible to calculate the predicted date using a line ST1 shown in FIG. 3A in place of the prediction line PS2. The line ST1 is a straight line passing through the initial coordinates IC1 specifying the initial residual quantity IR2 on the date ID2 and the latest coordinates C2 specifying the residual quantity R12 on the date D2. The slope of this line ST1 denotes the average change residual quantities of printing material per day within the period from the date ID2 to the date D2. Only usage conditions for printing material during a relatively short period from the date ID2 to the date D2 are taken into account in the calculation of the predicted date according to the line ST1. In the example illustrated in FIG. 3A, a relatively large quantity of printing material was consumed during the period from the date ID2 to the date D2. Hence, the absolute value of the slope of line ST1 is large and may result in the calculation of the predicted date SD1 much earlier than the actual date on which the cartridge runs out of printing material.

In the present embodiment, in contrast, the predicted date (PD2, for example) is calculated according to the prediction line PS2 passing through the virtual coordinates SC1 and the latest coordinates (C2, for example). By hypothesizing that the current cartridge is a virtual cartridge capable of accommodating printing material that exceeds the maximum quantity (i.e., 100%), the virtual coordinates SC1 indicate that printing material of the virtual residual quantity SR1 is accommodated in the virtual cartridge. Thus, the slope of the prediction line PS2 indicates the average change in residual quantities of printing material per day when the virtual cartridge is used during the period from the date ID2 to the date D2. Usage conditions of printing material over a lengthy period from the date ID1 to the date D2 are taken into account in the calculation of the predicted date PD2 according to this prediction line PS2. Therefore, the predicted date can be calculated more accurately in the present embodiment.

Further, the virtual coordinates SC1 used for calculating the prediction line PS2 are identified by calculating the virtual residual quantity SR1. The virtual residual quantity SR1 is found by adding the estimated consumption value EV1 indicating the preceding consumption quantity to the initial residual quantity IR1 on the date ID1, which is from the history of residual quantities of printing material for the preceding cartridge. Usage conditions of printing material in the preceding cartridge, i.e., the most recent usage conditions of printing material are taken into account in the calculation of the predicted date according to the prediction line PS2. Therefore, in the present embodiment, the predicted date can be calculated by taking into account the most recent usage conditions.

(Correspondences)

The management server 10 is an example of the control device. The Internet 6 is an example of the network. The preceding cartridge and the current cartridge are examples of the first cartridge and the second cartridge, respectively. The date ID1 is an example of the first calendar date. The initial residual quantity IR1 is an example of the first value. The date D2 is an example of the second calendar date. The residual quantity R12 on the date D2 is an example of the second value. The predicted date PD2 is an example of the third calendar date. The process of S54 is an example of the output process. The virtual residual quantity SR1 is an example of the reference value.

Second Embodiment

Figure 3B:
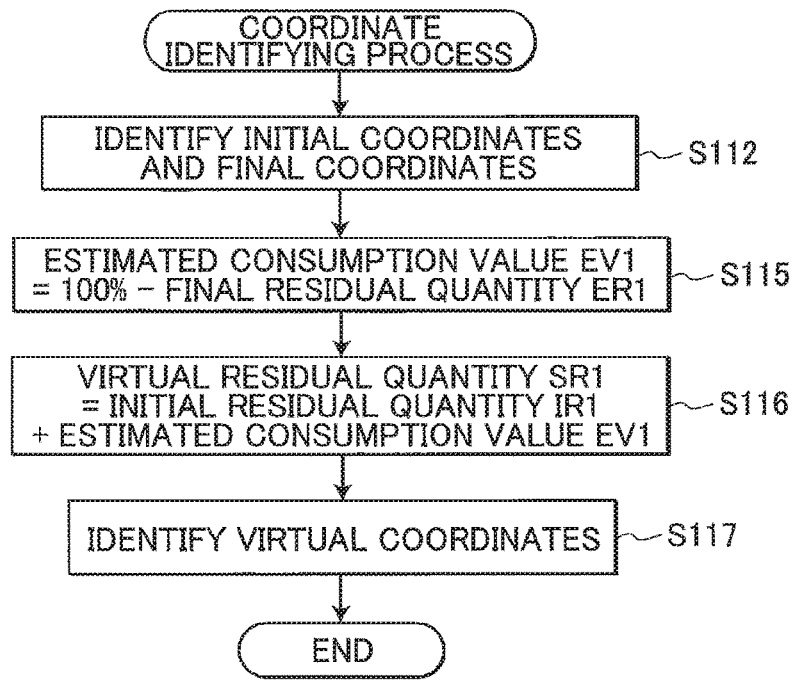
FIG. 3B is a flowchart illustrating steps in a coordinate identifying process in the first embodiment.
Figure 3C:
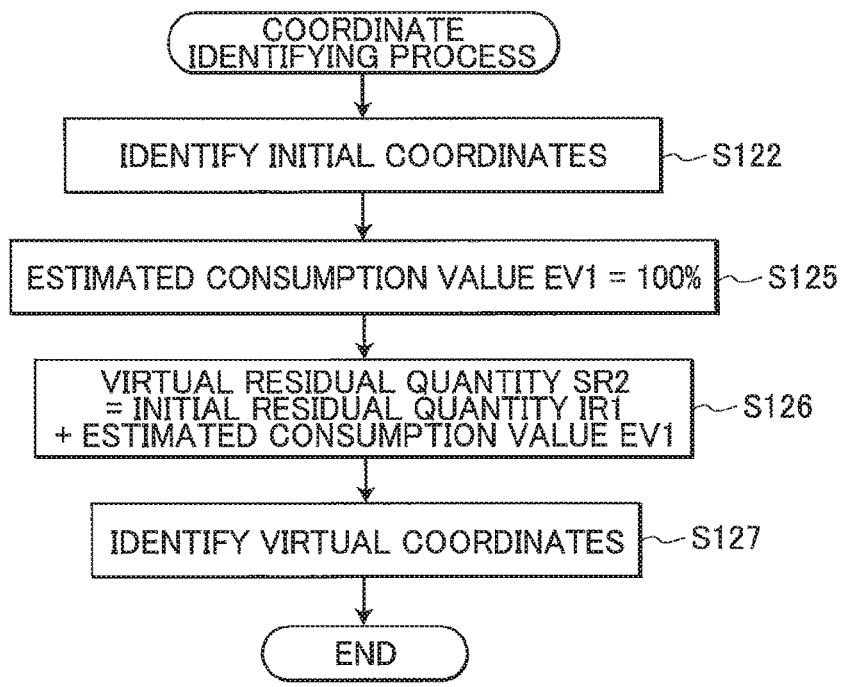
FIG. 3C is a flowchart illustrating steps in the coordinate identifying process in the second embodiment.

In the second embodiment of the present disclosure, processes in steps S112 through S117 illustrated in FIG. 3B are replaced with processes in steps S122 through S127 illustrated in FIG. 3C for the coordinate identifying process of S24 in FIG. 2.

In S122 of FIG. 3C, the CPU 22 identifies initial coordinates that specify an initial residual quantity IR1 from the replacement table CT1, as in S112 of FIG. 3B in the first embodiment. In S125 the CPU 22 identifies an estimated consumption value EV1 to be 100%, which is the maximum quantity of printing material that the cartridge can accommodate. That is, the CPU 22 identifies the estimated consumption value EV1 by assuming that all printing material in the cartridge is consumed over the period from when the preceding cartridge was attached to the printer 100 until the preceding cartridge was detached from the printer 100. In S126 the CPU 22 then calculates a virtual residual quantity SR2 by adding this estimated consumption value EV1 (i.e., 100%) to the initial residual quantity IR1 specified by the initial coordinates. Subsequently, in S127 the CPU 22 identifies virtual coordinates that specify the date indicated by the initial coordinates and the virtual residual quantity SR2 calculated in S126, and stores virtual coordinate information SI1 representing the virtual coordinates in the memory 24, as in the first embodiment described above.

(A Specific Case for the Second Embodiment; FIG. 3A)

As illustrated in FIG. 3A, when the CPU 22 acquires usage information UI1 that includes a current replacement count CN1 specifying "1" on a date ID2 for the first time, the CPU 22 calculates the virtual residual quantity SR2 by adding 100% as the estimated consumption value EV1 to the initial residual quantity IR1 on the date ID1 (S126), and stores the virtual coordinate information SI1 representing virtual coordinates SC2 that specify the virtual residual quantity SR2 on the date ID1 in the memory 24 (S127).

When the CPU 22 subsequently acquires usage information UI1 that includes a current replacement count CN1 specifying "1" on a date D2, the CPU 22 calculates a prediction line PS3 that passes through the virtual coordinates SC2 and the latest coordinates C2 specifying the residual quantity R12 on the date D2 (S36 of FIG. 2). Next, the CPU 22 calculates a predicted date PD3 to be the date specified by a point corresponding to a residual quantity of 0% on the prediction line PS3 (S50).

In the second embodiment, usage conditions of printing material over a length period from the date ID1 to the date ID2 are taken into account in the calculation of the predicted date PD3 according to the prediction line PS3. Therefore, the predicted date can be identified accurately in the second embodiment. In the second embodiment, the predicted date PD3 is an example of the third calendar date. The virtual residual quantity SR2 is an example of the reference value.

Third Embodiment

Figure 4A:
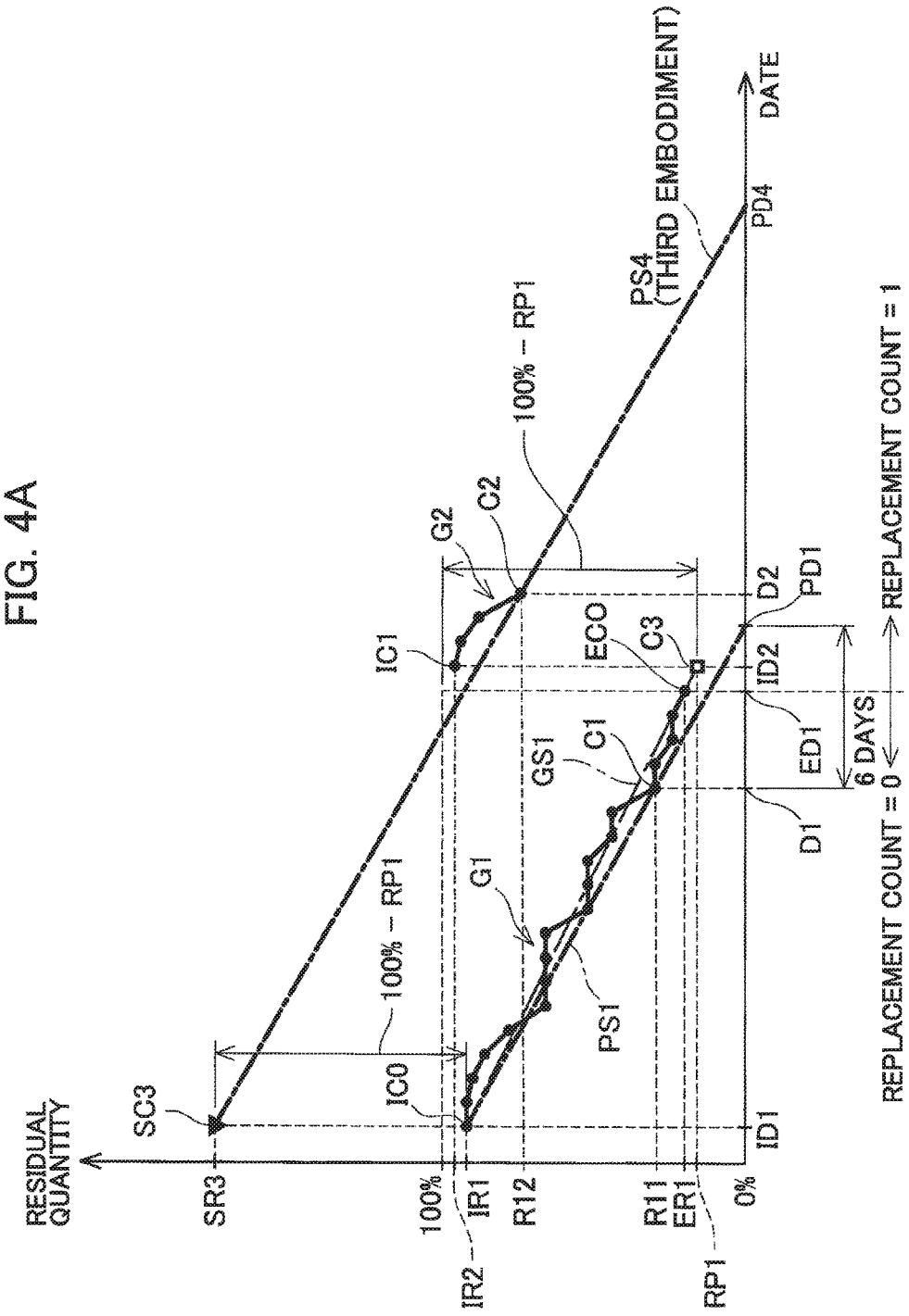
FIG. 4A is a graph showing changes in residual quantities of printing material in a specific case for the third embodiment.
Figure 4B:
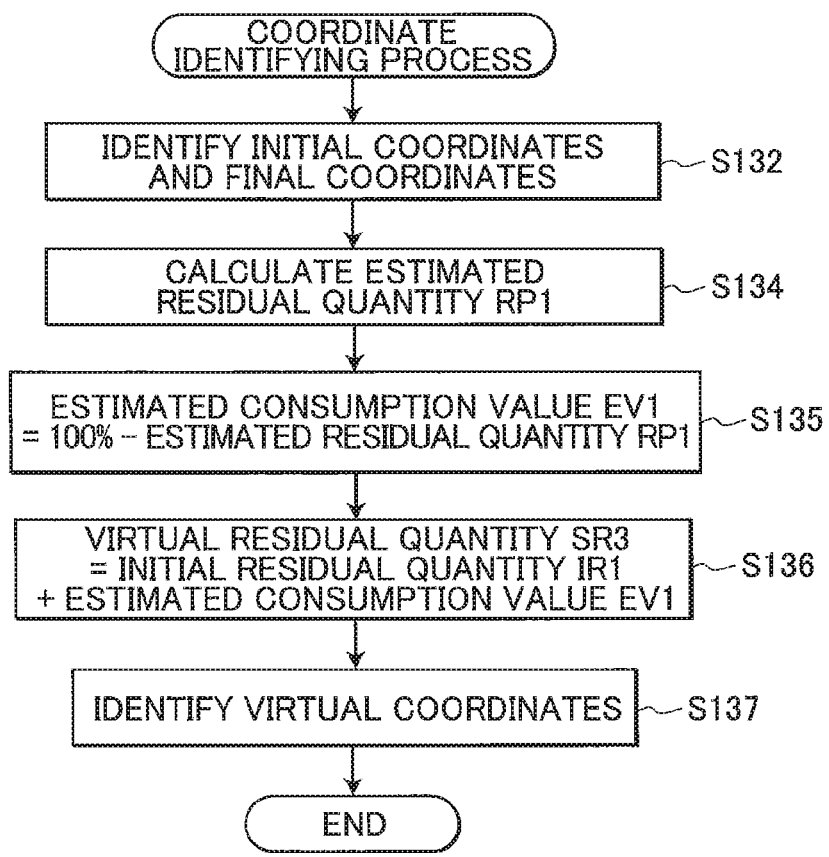
FIG. 4B is a flowchart illustrating steps in the coordinate identifying process in the third embodiment.

In the third embodiment of the present disclosure, processes in steps S112 through S117 illustrated in FIG. 3B are replaced with processes in steps S132 through S137 illustrated in FIG. 4B for the coordinate identifying process of S24 in FIG. 2.

In S132 of FIG. 4B, the CPU 22 identifies initial coordinates and final coordinates, as in S112 of FIG. 3B. Specifically, the CPU 22 identifies the initial coordinates that specify an initial residual quantity IR1 from the replacement table CT1. The CPU 22 also identifies the residual quantity acquired on the preceding day from the history information HI1 as a final residual quantity ER1, and sets the final coordinates to coordinates specifying the date of the preceding day and the final residual quantity ER1.

In S134 the CPU 22 calculates an estimated residual quantity RP1. Specifically, the CPU 22 calculates an estimation line that passes through the initial coordinates and the final coordinates. Finally, the CPU 22 calculates the estimated residual quantity RP1 to be the residual quantity of the current day on the estimation line.

In S135 the CPU 22 specifies an estimated consumption value EV1 indicating the preceding consumption quantity. Specifically, the CPU 22 specifies the estimated consumption value EV1 by subtracting the estimated residual quantity RP1 from the maximum quantity of 100%. In the third embodiment, the CPU 22 identifies the estimated consumption value EV1 under the assumption that the preceding cartridge was replaced with the current cartridge while the printing material of the quantity specified by the estimated residual quantity RP1 was still accommodated in the preceding cartridge.

In S136 the CPU 22 estimates a virtual residual quantity SR3. The CPU 22 calculates the virtual residual quantity SR3 by adding the estimated consumption value EV1 to the initial residual quantity IR1 specified by the initial coordinates.

Subsequently, in S137 the CPU 22 identifies virtual coordinates specifying the virtual residual quantity SR3, and stores virtual coordinate information SI1 representing the virtual coordinates in the memory 24, as described in the first embodiment.

(A Specific Case for the Third Embodiment; FIG. 4A)

As illustrated in FIG. 4A, when the CPU 22 acquires usage information UI1 that includes a current replacement count CN1 specifying "1" on a date ID2 for the first time, the CPU 22 calculates an estimation line GS1 that passes through the initial coordinates IC0 and the final coordinates EC0 specifying the residual quantity on the date ED1, that is, the final residual quantity ER1. The date ED1 is the date preceding the date ID2. The CPU 22 calculates the estimated residual quantity RP1 to be the residual quantity specified by coordinates C3 corresponding to the date ID2 on the estimation line GS1 (S134). The CPU 22 calculates the estimated consumption value EV1 by subtracting the estimated residual quantity RP1 from the maximum quantity of 100% (S135), and calculates the virtual residual quantity SR2 by adding the estimated consumption value EV1 to the initial residual quantity IR1 on the date ID1 (S136). The CPU 22 stores the virtual coordinate information SI1 representing virtual coordinates SC3 that specify the virtual residual quantity SR3 on the date ID1 in the memory 24 (S137).

When the CPU 22 subsequently acquires usage information UI1 that includes a current replacement count CN1 specifying "1" on a date D2, the CPU 22 calculates a prediction line PS4 that passes through the virtual coordinates SC3 and the latest coordinates C2 indicating the residual quantity R12 on the date D2 (S36 of FIG. 2). Next, the CPU 22 calculates a predicted date PD4 to be the date specified by a point corresponding to a residual quantity of 0% on the prediction line PS4 (S50).

In the third embodiment, usage conditions of printing material over a lengthy period from the date ID1 to the date D2 are taken into account in the calculation of the predicted date PD4 according to the prediction line PS4. Therefore, the predicted date can be identified accurately in the third embodiment. In the third embodiment, the predicted date PD4 is an example of the third calendar date. The date ID1 and date ED1 are examples of the at least two corresponding calendar dates. The date ID2 is an example of the fourth calendar date. The virtual residual quantity SR3 is an example of the reference value.

Fourth Embodiment

In the fourth embodiment of the present disclosure, the printer 100 stores, in the memory 110, a current consumption quantity U1 in place of the current residual quantity R1. That is, the usage information UI1 of the printer 100 includes the current consumption quantity U1 in place of the current residual quantity R1. In the present embodiment, the current consumption quantity U1 is represented by a ratio of the consumption quantity of printing material to the maximum quantity of printing material that the cartridge can accommodate (units: %). In other words, the consumption quantity is the value obtained by subtracting the residual quantity from the maximum quantity of 100%. Further, when the current consumption quantity U1 is greater than or equal to a threshold value for the consumption quantity (80%, for example), the printer 100 supplies usage information UI1 that includes a prescribed notification to the management server 10. When the current consumption quantity U1 is smaller than the threshold value for the consumption quantity, the printer 100 supplies usage information UI1 that does not include the prescribed notification to the management server 10.

In the fourth embodiment, the current consumption quantity U1 is used in place of the current residual quantity R1 in the ordering process of FIG. 2. Further, in the fourth through sixth embodiments, the coordinate system whose horizontal axis represents the date and whose vertical axis represents the consumption quantity of printing material is used. That is, a set of coordinates is a set of data identifying a date and a consumption quantity of printing material on the date.

In S10 of FIG. 2, the CPU 22 acquires usage information UI1 including the current consumption quantity U1 of printing material consumed during the period from when the cartridge was attached to the printer 100 and to the present time. In S12 the CPU 22 associates the current consumption quantity U1 included in the usage information UI1 acquired in S10 with the current date, and adds this information to the history information HI1 included in the registration information RI1. Hence, the history information HI1 specifies the history of current consumption quantities U1 for printing material.

Figure 5B:
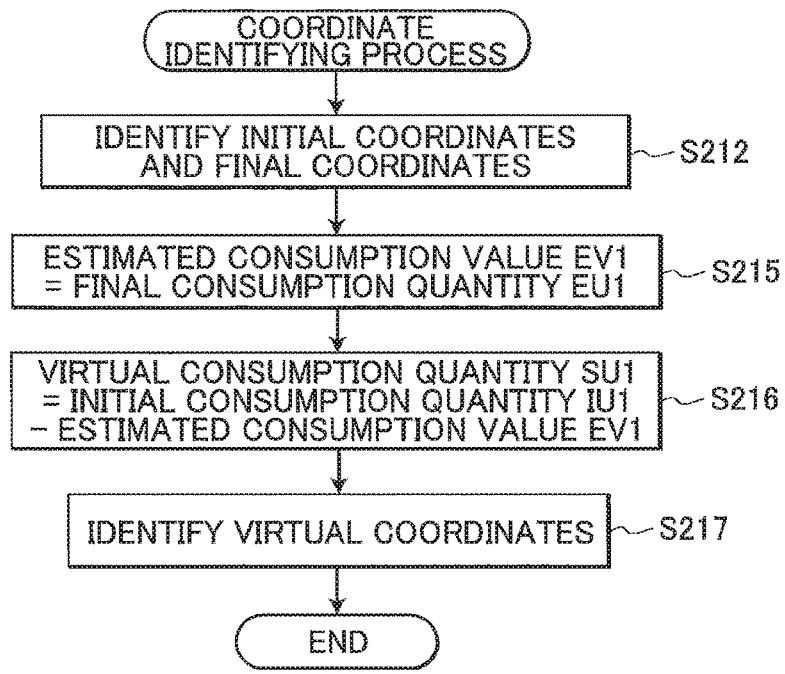
FIG. 5B is a flowchart illustrating steps in the coordinate identifying process in the fourth embodiment.

In S24 the CPU 22 executes the coordinate identifying process illustrated in FIG. 5B. In S212 of FIG. 5B, the CPU 22 identifies initial coordinates for the preceding cartridge from the replacement table CT1. In the following description, the consumption quantity specified by the initial coordinates will be called the "initial consumption quantity IU1." The CPU 22 also identifies the date of the preceding day and the consumption quantity on this date from the history information HI1 and sets the coordinates specifying this date and the consumption quantity as the final coordinates, as in S112 of FIG. 3B. That is, the final coordinates specify the date on which the usage information UI1 was acquired last time under a condition where the preceding cartridge was mounted in the printer 100 and the current consumption quantity U1 included in the acquired usage information UI1. In the following description, the consumption quantity specified by the final coordinates will be called the "final consumption quantity EU1."

In S215 the CPU 22 specifies an estimated consumption value EV1. More specifically, the CPU 22 specifies the estimated consumption value EV1 to be the final consumption quantity EU1 specified by the final coordinates. In the fourth embodiment, as in the first through third embodiments, the estimated consumption value EV1 is estimated to be the quantity of printing material consumed in the preceding cartridge during the period from when the preceding cartridge was attached to the printer 100 until the preceding cartridge was detached from the printer 100 (i.e., the preceding consumption quantity).

In S216 the CPU 22 estimates the virtual consumption quantity SU1. The CPU 22 calculates the virtual consumption quantity SU1 by subtracting the estimated consumption value EV1 from the initial consumption quantity IU1 specified by the initial coordinates.

Subsequently, in S217 the CPU 22 identifies virtual coordinates specifying the date specified by the initial coordinates and the virtual consumption quantity SU1 calculated in S216, and stores virtual coordinate information SI1 representing the virtual coordinates in the memory 24. The virtual coordinates specify a virtual consumption quantity SU1 of the current cartridge on the date specified by the initial coordinates when assuming that the current cartridge is a virtual cartridge capable of accommodating more printing material than the maximum quantity (i.e., 100%), and the virtual consumption quantity is the value obtained by subtracting the virtual residual quantity of the virtual cartridge on the date specified by the initial coordinates from the maximum quantity of 100%. That is, the virtual consumption quantity is a negative value when the virtual cartridge accommodates more printing material than 100%, and is 100% when the virtual cartridge has run out of printing material (i.e., the virtual cartridge is empty).

(A Specific Case for the Fourth Embodiment; FIG. 5A)

FIG. 5A illustrates a graph whose horizontal axis represents the date and whose vertical axis represents the consumption quantity of printing material. Each dot plotted on the graph indicates a consumption quantity on a date included in the history information HI1. A graph line G21 in the graph shows the history of consumption quantities of printing material in the first cartridge that was mounted in the printer 100 for the first time after the printer 100 was shipped. A graph line G22 shows the history of consumption quantities of printing material in the second cartridge with which the first cartridge was replaced. The graph lines G21 and G22 are graphs in which the residual quantities in the graph lines G1 and G2 illustrated in FIG. 3A are replaced with consumption quantities. Here, a specific case for the fourth embodiment will be described while avoiding duplicating description with the description for FIG. 3A.

When the CPU 22 acquires usage information UI1 including a current replacement count CN1 specifying "0" on a date ID1 for the first time, the CPU 22 records the initial coordinates IC0 specifying the initial consumption quantity IU1 on the date ID1 in the replacement table CT1 in association with the replacement count of "0" (S22: NO and S26). When the CPU 22 subsequently acquires usage information UI1 including a current replacement count CN1 specifying "0" on a date D1, the CPU 22 calculates a prediction line PS21 that passes through the initial coordinates IC0 and the latest coordinates C21 specifying the consumption quantity U11 on the date D1 (S40). The CPU 22 calculates a predicted date PD21 to be the date specified by a point corresponding to a consumption quantity of 100% on the prediction line PS21 (S50).

On a date ID2 the CPU 22 acquires usage information UI1 including a current replacement count CN1 specifying "1" for the first time (S20: NO and S22: YES). The CPU 22 then calculates a virtual consumption quantity SU1 by subtracting a final consumption quantity EU1 specified by the final coordinates EC20 from an initial consumption quantity IU1 on the date ID1 (S24 of FIGS. 2 and S212 through S216 of FIG. 5B). Next, the CPU 22 identifies virtual coordinates SC21 that specify the virtual consumption quantity SU1 on the date ID1, and stores virtual coordinate information SI1 representing the virtual coordinates SC21 in the memory 24 (S217).

When the CPU 22 subsequently acquires usage information UI1 including a current replacement count CN1 specifying "1" on a date D2, the CPU 22 calculates a prediction lien PS22 that passes through the virtual coordinates SC21 and the latest coordinates C22 specifying the consumption quantity U12 on the date D2 (S36). Next, the CPU 22 calculates a predicted date PD22 to be the date specified by a point corresponding to a consumption quantity of 100% on the prediction line PS22 (S50).

In the fourth embodiment, the predicted date PD22 can be identifies with accuracy. Here, the initial consumption quantity IU1 and the consumption quantity U12 on the date D2 are examples of the first value and the second value, respectively. The predicted date PD22 is an example of the third calendar date. The virtual consumption quantity SU1 is an example of the reference value.

Fifth Embodiment

Figure 5C:
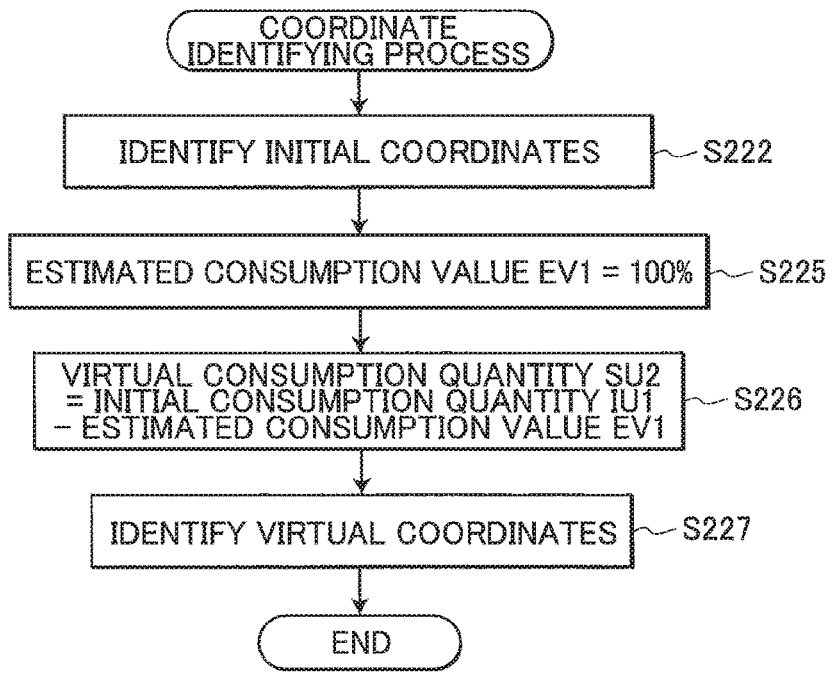
FIG. 5C is a flowchart illustrating steps in the coordinate identifying process in the fifth embodiment.

In the fifth embodiment of the present disclosure, processes in steps S222 through S227 illustrated in FIG. 5C are executed in place of processes in steps S212 through S217 illustrated in FIG. 5B.

In S222 of FIG. 5C, the CPU 22 identifies initial coordinates that specify an initial consumption quantity IU1 from the replacement table CT1, as in S212 of FIG. 5C in the fourth embodiment. In S225 the CPU 22 identifies an estimated consumption value EV1 to be 100%, which is the maximum quantity of printing material that the cartridge can accommodate. That is, the CPU 22 identifies the estimated consumption value EV1 by assuming that all printing material in the cartridge is consumed over the period from when the preceding cartridge was attached to the printer 100 until the preceding cartridge was detached from the printer 100. In S226 the CPU 22 then calculates a virtual consumption quantity SU2 by subtracting the estimated consumption value EV1 (i.e., 100%) from the initial consumption quantity IU1 specified by the initial coordinates. Subsequently, in S227 the CPU 22 identifies virtual coordinates that specify the date indicated by the initial coordinates and the virtual consumption quantity SU2 calculated in S226, and stores virtual coordinate information SI1 representing the virtual coordinates in the memory 24.

(A Specific Case for the Fifth Embodiment; FIG. 5A)

As in the fourth embodiment, when the CPU 22 acquires usage information UI1 that includes a current replacement count CN1 specifying "1" at a date ID2 (S10 and S20: NO of FIG. 2), the CPU 22 calculates the virtual consumption quantity SU2 by subtracting 100% as the estimated consumption value EV1 from the initial consumption quantity IU1 on the date ID1 (S222, S225, and S226 of FIG. 3) and stores the virtual coordinate information SI1 representing virtual coordinates SC22 that specify the virtual consumption quantity SU2 on the date ID1 in the memory 24 (S227).

When the CPU 22 subsequently acquires usage information UI1 that includes a current replacement count CN1 specifying "1" on a date D2, the CPU 22 calculates a prediction line PS23 that passes through the virtual coordinates SC22 and the latest coordinates C22 specifying the consumption quantity U12 on the date D2 (S36 of FIG. 2). Next, the CPU 22 calculates a predicted date PD23 to be the date specified by a point corresponding to a consumption quantity of 100% on the prediction line PS23 (S50).

In the present embodiment, the predicted date can be also identified with accuracy. Here, the predicted date PD23 is an example of the third calendar date. The virtual consumption quantity SU2 is an example of the reference value.

Sixth Embodiment

In the sixth embodiment of the present disclosure, processes in steps S232 through S237 illustrated in FIG. 6B are executed in place of processes S212 through S217 illustrated in FIG. 5B.

In S232 of FIG. 6B, the CPU 22 identifies initial coordinates and final coordinates, as in S212 of FIG. 5B. Specifically, the CPU 22 identifies the initial coordinates that specify an initial consumption quantity IU1 from the replacement table CT1. The CPU 22 also identifies the consumption quantity acquired on the preceding day from the history information HI1 as a final consumption quantity EU1, and sets the final coordinates to coordinates specifying the date of the preceding day and the final consumption quantity EU1.

In S234 the CPU 22 calculates an estimated consumption quantity RU1. Specifically, the CPU 22 calculates an estimation line that passes through the initial coordinates and the final coordinates. The CPU 22 calculates the estimated consumption quantity UP1 to be the consumption quantity specified by coordinates corresponding to the current day on the estimation line. In S235 the CPU 22 specifies an estimated consumption value EV1 indicating the preceding consumption quantity to be the estimated consumption quantity UP1.

In S236 the CPU 22 calculates a virtual consumption quantity SU3 by subtracting the estimated consumption quantity UP1 as the estimated consumption value EV1 from the initial consumption quantity IU1 specified by the initial coordinates. Subsequently, in S237 the CPU 22 identifies virtual coordinates specifying the virtual consumption quantity SU3, and stores virtual coordinate information SI1 representing the virtual coordinates in the memory 24.

(A Specific Case for the Sixth Embodiment; FIG. 6A)

As illustrated in FIG. 6A, when the CPU 22 acquires usage information UI1 that includes a current replacement count CN1 specifying "1" on a date ID2, the CPU 22 calculates an estimation line GS21 that passes through the initial coordinates IC0 and the final coordinates ECO specifying the date ED1 preceding the date ID2 and the final consumption quantity EU1. The CPU 22 calculates the estimated consumption quantity UP1 to be the consumption quantity specified by the coordinates C23 corresponding to the date ID2 on the estimation line GS21 (S234). The CPU 22 calculates the virtual consumption quantity SU3 by subtracting the estimated consumption quantity UP1 as the estimated consumption value EV1 from the initial consumption quantity IU1 on the date ID1 (S236). Next, the CPU 22 stores the virtual coordinate information SI1 representing the virtual coordinates SC23 that specify the virtual consumption quantity SU3 on the date ID1 in the memory 24 (S237).

When the CPU 22 subsequently acquires usage information UI1 that includes a current replacement count CN1 specifying "1" on a date D2, the CPU 22 calculates a prediction line PS24 that passes through the virtual coordinates SC23 and the latest coordinates C22 specifying the consumption quantity U12 on the date D2 (S36 of FIG. 2). Next, the CPU 22 calculates a predicted date PD24 to be the date specified by a point corresponding to the consumption quantity of 100% on the prediction line PS (S50).

In the sixth embodiment, the predicted date PD24 can be also identified accurately. Here, the predicted date PD24 is an example of the third calendar date. The initial consumption quantity IU1 and the final consumption quantity EU1 are an example of the at least two values. The virtual consumption quantity SU3 is an example of the reference value.

While the description has been made in detail with reference to specific embodiments, it would be apparent those skilled in the art that various changes and modifications may be made thereto. Variations of the above-described embodiments are provided below.

(Variation 1)

The registration information may also include billing information. The billing information specifies a method of payment for the user to whom cartridges are delivered. More specifically, billing information specifies one of a flat rate option or a pay-by-purchase option. With the flat rate option, the user is billed a fixed amount on a regular basis (every month, for example). With the pay-by-purchase option, the user is charged for each cartridge that is shipped. After registering the serial number SN1 of the printer 100 in the memory 24 of the management server 10, the CPU 22 acquires the billing information together with the address information AI1 from the printer 100 and records the billing information and the address information AI1 in the memory 24 in association with the serial number SN1.

In this case, the CPU 22 may execute the following process in the coordinate identifying process of S24 in FIG. 2. When the billing information included in the registration information identified in S10 specifies the flat rate option, the CPU 22 executes S112 through S117 of FIG. 3B. When the billing information specifies the pay-by-purchase option, the CPU 22 executes S122 through S127 of FIG. 3C. In this way, the CPU 22 changes the method of calculating the prediction line according to the method of payment specified by the billing information.

With the flat rate option, the user pays a fixed fee regardless of the number of times that cartridges are delivered to the user. Consequently, there is a high probability that the user replaces a cartridge before the cartridge runs out of printing material. With the pay-by-purchase option, on the other hand, the fee paid by the user increases as the number of times that cartridges are delivered to the user increases. Consequently, there is a high probability that the user replaces a cartridge only after the cartridge has run out of printing material. Thus, in S112 through S117 executed when the method of payment is the flat rate option, the CPU 22 specifies the estimated consumption value EV1 under the assumption that the cartridge is replaced without running out of printing material. In contrast, in S122 through S127 executed when the method of payment is the pay-by-purchase option, the CPU22 specifies the estimated consumption value EV1 under the assumption that the cartridge is replaced after running out of printing material. Accordingly, the method according to this variation of the embodiments can specify the estimated consumption value EV1 appropriate for the method of payment and, hence, can calculate the predicted date appropriate for the method of payment.

(Variation 2)

The management server 10 may be omitted from the communication system 2. In this case, the control unit of the printer 100 may execute the ordering process of FIG. 2. Here, the control unit of the printer 100 and the printing engine of the printer 100 are examples of the control device and the printer, respectively.

(Variation 3)

In S116 of FIG. 3B, the CPU 22 may calculate the virtual residual quantity SR1 by adding the estimated consumption value EV1 to the residual quantity specified by coordinates other than the initial coordinates. The other coordinates may be coordinates specifying the residual quantity on an intermediate date between the earliest date and the latest date within the history of residual quantities for the preceding cartridge. In this variation, the date and the residual quantity specified by the other coordinates are examples of the first calendar date and the first value, respectively.

(Variation 4)

When the CPU 22 acquires, for the first time, the usage information UI1 that includes the current replacement count CN1 specifying "1" on the date ID2 illustrated in FIG. 3, for example, the CPU 22 may calculate the virtual residual quantity SR1 as described in the first embodiment. When the CPU 22 subsequently acquires the usage information UI1 that includes the current replacement count CN1 specifying "1" on the day following the date ID2, the CPU 22 may calculate a new virtual residual quantity SR1 by adding the estimated consumption value EV1 to the residual quantity on the day following the date ID1, and may update the virtual coordinate information SI1. In this variation, the date of the day following the date ID1 is an example of the first calendar date, and the residual quantity on the day following the date ID1 is an example of the first value.

(Variation 5)

In S116 and S117 of FIG. 3B, the CPU 22 may identify a plurality of sets of virtual coordinates. For example, the CPU 22 may calculate a plurality of virtual residual quantities SR1 by adding the estimated consumption value EV1 to each of a plurality of residual quantities on a plurality of dates from the date ID1 to the date ED1. When the CPU 22 subsequently acquires the usage information UI1 on the date D2, the CPU 22 may calculate a prediction line using the plurality of sets of virtual coordinates and the latest coordinates specifying the residual quantity on the date D2. In this case, the least square method may be used for calculating the prediction line, for example.

(Variation 6)

The CPU 22 may also calculate the virtual residual quantity SR2 using the history of residual quantities of printing material in a cartridge mounted in the printer 100 prior to the preceding cartridge (hereinafter called the "cartridge preceding to the preceding cartridge"). In place of S125 and S126 in FIG. 3C, the CPU 22 may specify a virtual residual quantity SR2 by adding 200% as the estimated consumption value EV1 to the initial residual quantity IR1 of the cartridge preceding to the preceding cartridge, for example. In this variation, the cartridge preceding to the preceding cartridge is an example of the first cartridge.

(Variation 7)

The CPU 22 may execute a slope calculating process in place of the process in S24 of FIG. 2. In the slope calculating process, the CPU 22 may calculate an approximation straight line, for example, using a plurality of residual quantities on a plurality of dates in the history information HI1 (the history of residual quantities of printing material in the preceding cartridge, for example). The CPU 22 may also store slope information indicating the slope of the approximation straight line in the memory 24 in place of the virtual coordinate information SI1. Next, the CPU 22 may calculate a prediction line that passes through coordinates specifying the residual quantity on the current day and that has the slope indicated by the slope information. In this variation, one date among the plurality of dates is an example of the first calendar date, and one residual quantity among the plurality of residual quantities is an example of the first value.

(Variation 8)

In the ordering process of FIG. 2, the CPU 22 may omit step S50 and subsequent steps. In this case, the CPU 22 may identify a residual quantity on a date following the latest date by a prescribed number of days (three days, for example) on the prediction line, and may supply, to the printer 100, information indicating the residual quantity identified for this date in order to display this residual quantity on a display unit of an external device (the printer 100, for example). In this variation, the identified residual quantity is an example of the third value, and the step for supplying information indicating the residual quantity is an example of the outputting process.

(Variation 9)

In the ordering process of FIG. 2, the CPU 22 may omit steps S52 and SM. In this case, the CPU 22 may supply information indicating the predicted date to the printer 100 in order to display this predicted date on an external device (the display unit of the printer 100, for example). In this variation, the step for supplying the information indicating the predicted date is an example of the outputting process.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

What is claimed is:

1. A non-transitory computer readable storage medium storing a set of program instructions for a control device including a controller, the set of program instructions, when executed by the controller, causing the control device to perform:
    acquiring a first value from a printer under a condition where a first cartridge is mounted in the printer, the first value being related to a residual quantity of printing material remaining in the first cartridge at a first calendar date;
    acquiring a second value from the printer under a condition where a second cartridge is mounted in the printer, the second cartridge being attached to the printer later than detachment of the first cartridge, the second value being related to a residual quantity of printing material remaining in the second cartridge at a second calendar date;
    estimating a third calendar date using the first value, the second value, and a time interval between the first calendar date and the second calendar date, the third calendar date being a calendar date when a third value related to the residual quantity of printing material remaining in the second cartridge is assumed to be smaller than a prescribed quantity; and
    executing an output process according to the third calendar date.

2. The non-transitory computer readable storage medium according to claim 1, wherein the first cartridge is replaced with the second cartridge.

3. The non-transitory computer readable storage medium according to claim 1, wherein the acquiring a first value is repeatedly performed to acquire a plurality of values including the first value from the printer at different calendar dates including the first calendar date while the first cartridge is mounted in the printer, each of the plurality of values being related to a residual quantity of printing material remaining in the first cartridge at corresponding one of the different calendar dates, and
    wherein the first calendar date is an earliest one among the different calendar dates.

4. The non-transitory computer readable storage medium according to claim 1, wherein the third calendar date is a calendar date when printing material remaining in the second cartridge is decreased to a level such that printing with the second cartridge is no longer possible.

5. The non-transitory computer readable storage medium according to claim 1, wherein the first value and the second value are acquired from the printer via a network.

6. The non-transitory computer readable storage medium according to claim 1, wherein the set of program instructions, when executed by the controller, causes the control device to further perform:
    specifying an estimated consumption value of printing material in the first cartridge during a period from attachment of the first cartridge to the printer to detachment of the first cartridge from the printer, and
    wherein the estimating determines a reference value using the first value and the estimated consumption value, and estimates the third calendar date using the reference value, the second value, and the time interval between the first calendar date and the second calendar date.

7. The non-transitory computer readable storage medium according to claim 6, wherein the acquiring a first value is repeatedly performed to acquire a plurality of values including the first value and a fourth value from the printer at different calendar dates including the first calendar date and a fourth calendar date while the first cartridge is mounted in the printer, each of the plurality of values indicating a residual quantity of printing material remaining in the first cartridge at corresponding one of the different calendar dates, the first value indicating the residual quantity of printing material remaining in the first cartridge at the first calendar date, the fourth value indicating a residual quantity of printing material remaining in the first cartridge at a fourth calendar date latest among the different calendar dates,
    wherein the acquiring a second value acquires the second value indicating a residual quantity of printing material remaining in the second cartridge at the second calendar date,
    wherein the specifying specifies the estimated consumption value by subtracting the fourth value from a maximum quantity of printing material that the first cartridge can accommodate, and
    wherein the estimating estimates the reference value by adding the estimated consumption value to the first value.

8. The non-transitory computer readable storage medium according to claim 6, wherein the acquiring a first value acquires the first value indicating a residual quantity of printing material remaining in the first cartridge at the first calendar date,
    wherein the acquiring a second value acquires the second value indicating a residual quantity of printing material remaining in the second cartridge at the second calendar date,
    wherein the specifying specifies a maximum quantity of printing material that the first cartridge can accommodate as the estimated consumption value, and
    wherein the estimating estimates the reference value by adding the estimated consumption value to the first value.

9. The non-transitory computer readable storage medium according to claim 6, wherein the acquiring a first value is repeatedly performed to acquire a plurality of values including the first value from the printer at different calendar dates including the first calendar date while the first cartridge is mounted in the printer, each of the plurality of values indicating a residual quantity of printing material remaining in the first cartridge at corresponding one of the different calendar dates, the first value indicating the residual quantity of printing material remaining in the first cartridge at the first calendar date,
    wherein the acquiring a second value acquires at least one value including the second value from the printer while the second cartridge is mounted in the printer, each of the at least one value indicating a residual quantity of printing material remaining in the second cartridge, the second value indicating a residual quantity of printing material remaining in the second cartridge at the second calendar date, the second value being acquired latest among the at least one value,
    wherein the specifying estimates an estimated residual quantity remaining in the first cartridge at a fourth calendar date using at least two values selected from the plurality of values and at least two corresponding calendar dates and specifies the estimated consumption value by subtracting the estimated residual quantity from a maximum quantity of printing material that the first cartridge can accommodate, one of the at least one value being acquired earliest at the fourth calendar date, and wherein the estimating estimates the reference value by adding the estimated consumption value to the first value.

10. The non-transitory computer readable storage medium according to claim 6, wherein the acquiring a first value is repeatedly performed to acquire a plurality of values including the first value and a fourth value from the printer at different calendar dates including the first calendar date and a fourth calendar date while the first cartridge is mounted in the printer, each of the plurality of values indicating a consumption quantity of printing material in the first cartridge during a period from attachment of the first cartridge to the printer to corresponding one of the different calendar dates, the first value indicating a consumption quantity of printing material in the first cartridge at the first calendar date, the fourth value indicating a consumption quantity of printing material in the first cartridge at the fourth calendar date latest among the different calendar dates,
wherein the acquiring a second value acquires the second value indicating a consumption quantity of printing material in the second cartridge during a period from attachment of the second cartridge to the printer to the second calendar date,
wherein the specifying specifies the fourth value as the estimated consumption value, and
wherein the estimating estimates the reference value by subtracting the estimated consumption value from the first value.

11. The non-transitory computer readable storage medium according to claim 6, wherein the acquiring a first value acquires the first value indicating a consumption quantity of printing material in the first cartridge during a period from attachment of the first cartridge to the printer to the first calendar date,
wherein the acquiring a second value acquires the second value indicating a consumption quantity of printing material in the second cartridge during a period from attachment of the second cartridge to the printer to the second calendar date,
wherein the specifying specifies a maximum quantity of printing material that the first cartridge can accommodate as the estimated consumption value, and
wherein the estimating estimates the reference value by subtracting the specific estimated value from the first value.

12. The non-transitory computer readable storage medium according to claim 6, wherein the acquiring a first value is repeatedly performed to acquire a plurality of values including the first value from the printer at different calendar dates including the first calendar date while the first cartridge is mounted in the printer, each of the plurality of values indicating a consumption quantity of printing material in the first cartridge during a period from attachment of the first cartridge to the printer to corresponding one of the different times, the first value indicating a consumption quantity of printing material in the first cartridge at the first calendar date,
wherein the acquiring a second value acquires at least one value including the second value from the printer while the second cartridge is mounted in the printer, each of the at least one value indicating a consumption quantity of printing material in the second cartridge from attachment of the second cartridge to the printer, the second value indicating a consumption quantity of printing material in the second cartridge at the second calendar date, the second value being acquired latest among the at least one value,
wherein the specifying estimates an estimated consumption quantity in the first cartridge at a fourth calendar date using at least two values selected from the plurality of values and at least two corresponding calendar dates and specifies the estimated consumption quantity as the estimated consumption value, one of the at least one value being acquired earliest at the fourth calendar date, and
wherein the estimating estimates the reference value by subtracting the estimated consumption value from the first value.

13. A method for a control device including a controller, the method comprising:
acquiring a first value from a printer under a condition where a first cartridge is mounted in the printer, the first value being related to a residual quantity of printing material remaining in the first cartridge at a first calendar date;
acquiring a second value from the printer under a condition where a second cartridge is mounted in the printer, the second cartridge being attached to the printer later than detachment of the first cartridge, the second value being related to a residual quantity of printing material remaining in the second cartridge at a second calendar date;
estimating a third calendar date using the first value, the second value, and a time interval between the first calendar date and the second calendar date, the third calendar date being a calendar date when a third value related to the residual quantity of printing material remaining in the second cartridge is assumed to be smaller than a prescribed quantity; and
executing an output process according to the third calendar date.

14. A control device comprising:
a controller configured to perform:
acquiring a first value from a printer under a condition where a first cartridge is mounted in the printer, the first value being related to a residual quantity of printing material remaining in the first cartridge at a first calendar date;
acquiring a second value from the printer under a condition where a second cartridge is mounted in the printer, the second cartridge being attached to the printer later than detachment of the first cartridge, the second value being related to a residual quantity of printing material remaining in the second cartridge at a second calendar date;
estimating a third calendar date using the first value, the second value, and a time interval between the first calendar date and the second calendar date, the third calendar date being a calendar date when a third value related to the residual quantity of printing material remaining in the second cartridge is assumed to be smaller than a prescribed quantity; and
executing an output process according to the third calendar date.

* * * * *